United States Patent [19]

Lipsztajn

[11] Patent Number: 4,731,169
[45] Date of Patent: Mar. 15, 1988

[54] SELECTIVE REMOVAL OF CHLORINE FROM SOLUTIONS OF CHLORINE DIOXIDE AND CHLORINE

[75] Inventor: Marek Lipsztajn, Rexdale, Canada

[73] Assignee: Tenneco Canada Inc., Islington, Canada

[21] Appl. No.: 924,570

[22] Filed: Oct. 29, 1986

[51] Int. Cl.⁴ .............................................. C25B 1/26
[52] U.S. Cl. ...................................... 204/130; 204/94; 204/95; 204/101; 204/103
[58] Field of Search .................... 204/94, 95, 101, 103, 204/130

[56] References Cited

U.S. PATENT DOCUMENTS

| | | | |
|---|---|---|---|
| 1,740,165 | 12/1929 | Englehardt | 204/94 |
| 2,717,237 | 9/1955 | Rempel | 204/101 |
| 3,102,085 | 8/1963 | Edwards et al. | 204/94 |
| 3,616,385 | 10/1971 | Kloss et al. | 204/130 |
| 3,884,777 | 5/1975 | Harke et al. | 204/95 |
| 3,969,201 | 7/1976 | Oloman et al. | 204/83 |
| 4,222,833 | 9/1980 | Carlson | 204/130 |
| 4,456,510 | 6/1984 | Murakami et al. | 204/101 |

FOREIGN PATENT DOCUMENTS 1049950 3/1979 Canada ............... 204/101

Primary Examiner—T. Tung
Attorney, Agent, or Firm—Sim & McBurney

[57] ABSTRACT

Chlorine is selectively cathodically electrolytically removed from aqueous solutions of chlorine dioxide and chlorine by the application of an electrode potential at a pH of the aqueous solution of up to about 4. Chlorine is electrolytically reduced to chloride ions while the concentration of the chlorine dioxide remains substantially the same in the treated solution. The chlorine reduction is effected directly at pH values up to about 2 using a low overpotential cathode and indirectly at pH values up to about 4 using a high overpotential cathode.

12 Claims, 4 Drawing Figures

FIG.1. Voltammetric reduction of $Cl_2/ClO_2$ mixture

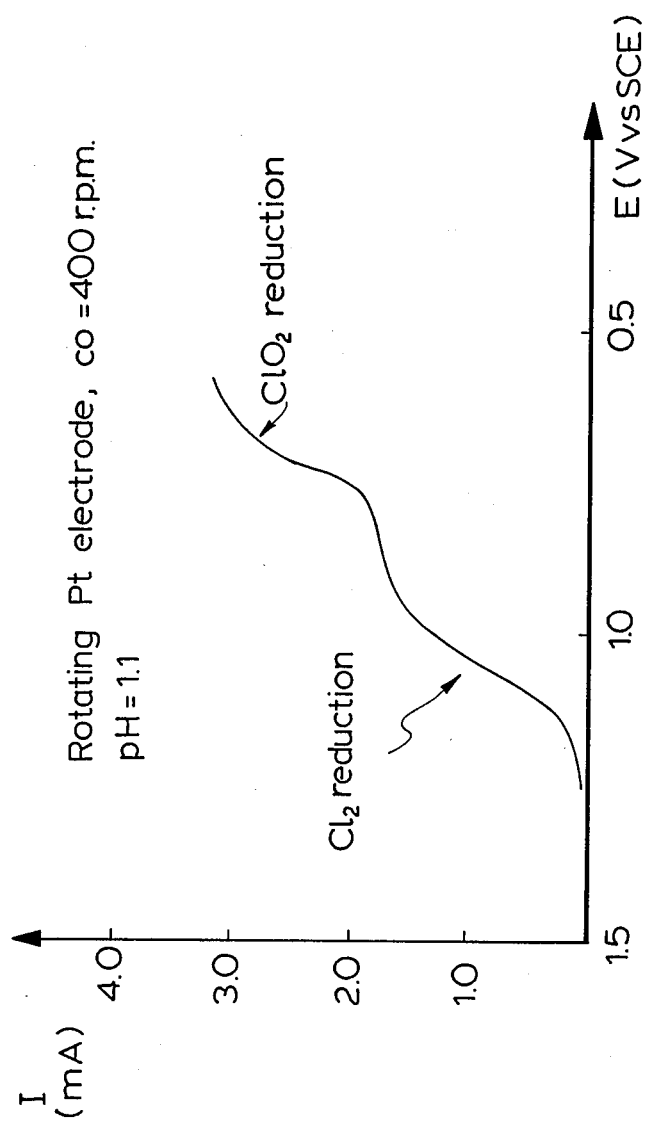

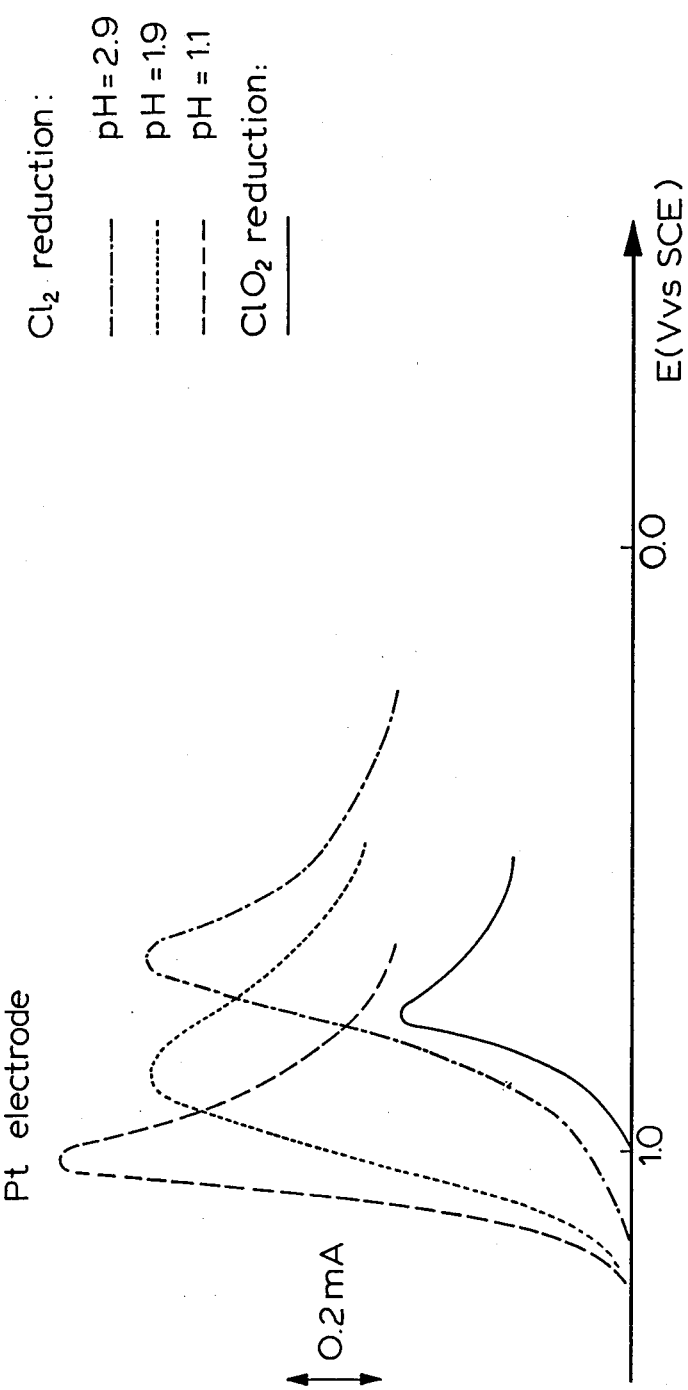
FIG. 2. Comparison of $Cl_2$ and $ClO_2$ electroreduction Pt electrode

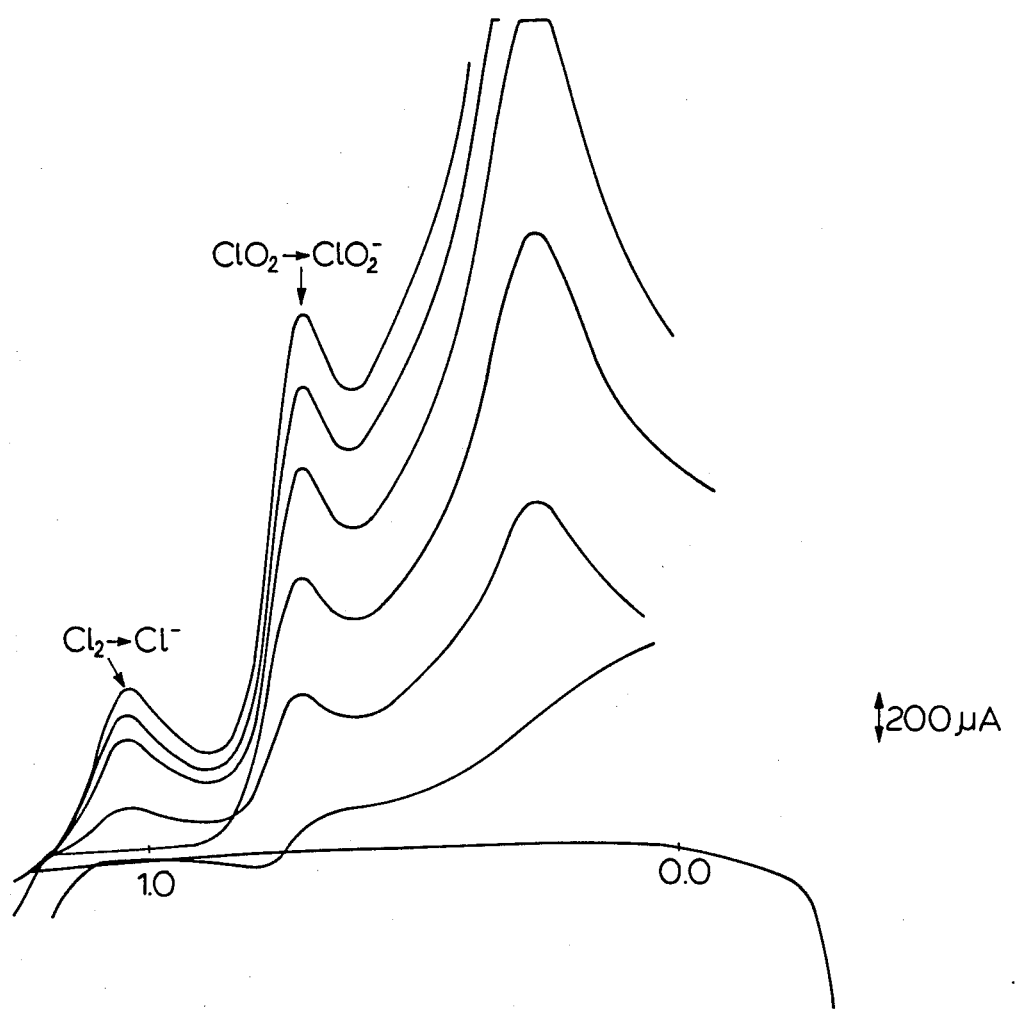
FIG. 3. Cyclic voltammograms for $ClO_2/Cl_2$ mixture at various concentrations  pH = 0.6

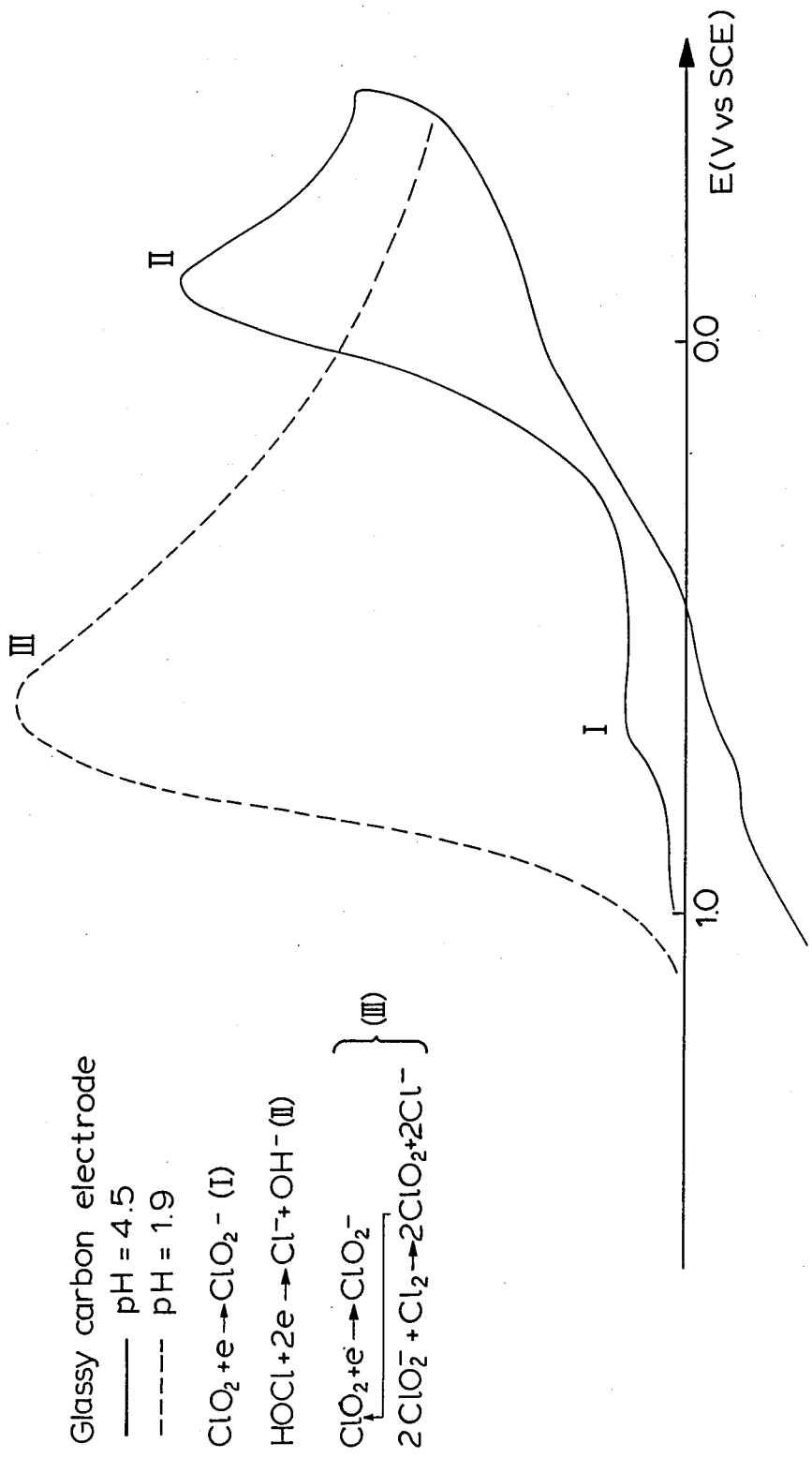
FIG. 4. Electrocatalytic reduction of $Cl_2$ in the presence of $ClO_2$
Glassy carbon electrode
—— pH = 4.5
---- pH = 1.9
$ClO_2 + e \rightarrow ClO_2^-$ (I)
$HOCl + 2e \rightarrow Cl^- + OH^-$ (II)
$\left.\begin{array}{l} ClO_2 + e \rightarrow ClO_2^- \\ 2ClO_2^- + Cl_2 \rightarrow 2ClO_2 + 2Cl^- \end{array}\right\}$ (III)

SELECTIVE REMOVAL OF CHLORINE FROM SOLUTIONS OF CHLORINE DIOXIDE AND CHLORINE

FIELD OF INVENTION

The present invention relates to the selective electrolytic removal of chlorine from aqueous solutions of chlorine dioxide and chlorine.

BACKGROUND OF THE INVENTION

Chlorine dioxide is extensively used as a bleach chemical for wood pulps and may be formed by a variety of processes. Most large scale commercial operations are based on reduction of sodium chlorate in an aqueous acid reaction medium. The chlorine dioxide usually is dissolved in water and is used as an aqueous solution.

Chlorine usually is coproduced with the chlorine dioxide, either as a result of the employment of added chloride ions as the reducing agent or as a result of inefficiencies in the chlorine dioxide generating process.

It often is desirable to provide an aqueous chlorine dioxide solution which is substantially chlorine free, for example, in pulp bleaching operations where a high proportion of chlorine dioxide is required. Prior proposals for the separation of chlorine from aqueous chlorine dioxide solutions have involved selective stripping procedures, as described in U.S. Pat. No. 3,854,901 (E121), assigned to the assignee hereof.

SUMMARY OF THE INVENTION

It has now been found that chlorine can be selectively removed electrolytically from aqueous solutions of chlorine dioxide and chlorine. According to the present invention, there is provided a method for the treatment of an aqueous solution of chlorine dioxide and chlorine, which comprises selectively cathodically reducing at least a portion of the chlorine at a pH of the aqueous solution of up to about 4, without substantially decreasing the concentration of chlorine dioxide in the resulting treated solution. The chlorine dioxide concentration is substantially unaffected and only the chlorine is reduced to chloride ion. The electrolytic process may be applied to effect removal of some or all of the dissolved chlorine, as desired. The chlorine may be reduced directly or indirectly, depending on the process conditions, as described in more detail below.

BRIEF DESCRIPTION OF DRAWINGS

FIGS. 1 to 4 are graphical representations of the voltammetric reduction of chlorine and chlorine dioxide in aqueous solution.

GENERAL DESCRIPTION OF INVENTION

In order to effect selective removal of chlorine from an aqueous solution of chlorine dioxide and chlorine, there are a number of criticalities which must be observed, as discussed in detail below.

One such criticality is the pH of the aqueous solution of chlorine dioxide and chlorine. For direct reduction of chlorine, a pH value no greater than about 2 is required. At pH values below 2, the chlorine is present in the aqueous phase as $Cl_2$ and hence can be directly reduced. At higher pH values up to about 4, the chlorine is present in an equilibrium condition with other forms of "active chlorine", mainly HOCl, which permits indirect reduction of the chlorine to chloride ion.

The effectiveness of the chlorine removal process at such pH values then is dependent upon the rate of the equilibrium reaction:

$$HOCl + HCl \rightleftharpoons Cl_2 + H_2O$$

For these reasons, it is necessary to operate at a maximum pH of about 2 for direct reduction while indirect reduction, as described in more detail below, may be effected up to about pH 4. At pH values above 4, the "active chlorine" does not include free $Cl_2$ and selective reduction of $Cl_2$ to chloride ion, therefore, is not possible.

A cathode having a low overpotential to the electrolytic reaction $Cl_2 \rightarrow Cl^-$ is required for solutions having a pH of up to about 2.

As is well known to those skilled in the electrochemical art, the overpotential of an electrode towards the electrochemical reaction $Cl_2/Cl^-$ refers to the relationship of the potential applied to the electrode to the equilibrium potential to sustain the electrochemical reaction at a reasonable rate. If the electrode potential is close to the equilibrium potential, then the electrode is considered to have a "low" overpotential while, if a much more negative potential is required to achieve a significant reduction rate, then the electrode is considered to have a "high" overpotential.

Materials of construction of such low overpotential electrodes are known and are employed in the so-called "Dimensionally Stable Electrodes". Such electrodes generally comprise a substrate, which is titanium, zirconium, tantalum or hafnium, having an electroconductive coating thereon, which may be a precious metal, for example, platinum; a precious metal alloy, for example, a platinum-iridium alloy; a metal oxide, for example, ruthenium oxide or titanium dioxide; a platinate, for example, lithium platinate or calcium platinate; or mixtures of two or more of such materials. Any of these materials may be employed to provide the material of construction of the low overpotential cathode. A platinum surface typically has an overpotential to the $Cl_2/Cl^-$ reaction of about 40 mV.

The use of high overpotential electrodes, for example, carbon electrodes; also is possible at pH values up to about 2 and is required at higher pH values up to about 4. With such electrodes, the reactions involved do not include the direct electroreduction of the chlorine which occurs with the low overpotential cathodes, but rather is an indirect reduction wherein the chlorine is chemically reduced to chloride by chlorite ion which is itself electrochemically produced from chlorine dioxide, in accordance with the following reactions:

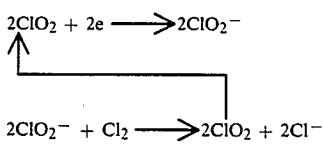

The overall reaction, therefore, is:

$$Cl_2 + 2e \rightarrow 2Cl^-$$

The physical form of the cathode used in the present invention is not critical and may be a flat plate electrode or, more preferably, a high surface area cathode having a three dimensional electrolyte-contacting surface. The latter type of electrode permits a long contact time between the aqueous solution of chlorine dioxide and chlorine.

The term "high surface area" in relation to the cathode refers to an electrode of the type wherein the electrolyte is exposed to a large surface area of electrode surface in comparison to the physical dimensions of the electrode. The electrode is formed with interstices through which the electrolyte flows, and so has a three-dimensional surface of contact with the electrolyte.

The high surface area cathode may be the so-called "flow through" type, wherein the electrode is formed of electroconductive porous material, for example, layers of electroconductive cloth and the electrolyte flows through the porous structure generally parallel to the current flow while being subjected to electrolysis, and thereby is exposed to the high surface area of the mesh of the electrode.

The high surface area cathode may also be the so-called "flow by" type, wherein the electrode comprises a packed bed of individual electroconductive particles and the electrolyte flows through the packed bed generally perpendicular to the current flow while being subjected to electrolysis, and thereby is exposed to the high surface area of the electroconductive particles in the packed bed.

The high surface area of the cathode permits the electrolyte to contact the cathode for an extended period of time, so as to permit electrolytic reduction of the chlorine to chloride ions to occur. The surface are employed and the conditions of operation of the electrolytic cell depend on the concentration of chlorine present in the aqueous solution of chlorine dioxide and chlorine. Depending on the cell capacity, the electrolyte may be circulated a number of times through the high surface area cathode to reduce the dissolved chlorine.

The cell in which the electrolysis is effected in accordance with the present invention may have any convenient construction. Usually, the cell is divided into anolyte and catholyte compartments by an ion-exchange membrane, usually a cation-exchange membrane so as to prevent the interaction of gases produced at the anode, usually oxygen, with the chlorine dioxide and the electroreduction at the cathode. With such a divided cell, the anolyte may be any desired electrolyte, typically an acid medium, such as sulphuric acid. The anode of the cell may be constructed of any desired electroconductive material, for example, graphite or metal.

Another important feature of the invention is the electrode potential which is applied to the cathode. It is essential for the embodiment of the invention effected at pH values up to about 2, i.e. direct reduction, that the electrode potential of the low overpotential electrode be about +0.8 to about 1.2 volts as compared with a saturated calomel electrode (SCE), preferably about +1 volts vs. SCE. At more negative electrode potentials than +0.8 volts, the electroreduction no longer is selective for aqueous solutions of chlorine dioxide and chlorine having a pH up to about 2 and electroreduction of chlorine dioxide can occur. At more positive electrode potentials than +1.2 volts, electroreduction of chlorine does not occur.

For the embodiment of the invention effected at pH values up to about 4, i.e. indirect reduction, it is essential that the electrode potential of the high overpotential electrode be about +0.8 to about −0.6 volts as compared with SCE.

As noted above, the method of the present invention preferably is carried out using a high surface area three-dimensional electrode. The electrode potential applied to such an electrode is the solution potential at the feeder to the three-dimensional electrode.

The voltage which is applied between the anode and cathode to provide the desired electrode potential depends on the materials of construction of the cathode and anode but generally is less than 2 volts. A constant voltage mode of application of the electrode potential is preferred, although other modes may be adopted.

The aqueous solution of chlorine dioxide and chlorine which is treated in accordance with the present invention usually is one formed by dissolving in water chlorine dioxide in the off-gas stream from a chlorine dioxide generator. Such solution contains a variable concentration of chlorine dioxide, depending on the flow rate of the water to the absorption tower and temperature of the water passing to the absorption tower and also a variable concentration of chlorine, also depending on the above-noted variables but also depending on the partial pressure of chlorine in the generator off-gas stream. Usually, the aqueous solution of chlorine dioxide and chlorine contains about 0.1 to about 20 g/L of chlorine dioxide and about 0.01 to about 10 g/L of chlorine.

The cathodic reduction of the chlorine contained in the aqueous solution of chlorine dioxide and chlorine may be effected to any desired degree of removal, depending on the end use to which the solution is to be put. Usually, the cathodic electrolysis is effective in rapidly decreasing the chlorine concentration to very low levels.

By the use of a critical combination of parameters, it is possible to selectively, and if desired completely, remove chlorine from an aqueous solution of chlorine dioxide and chlorine, either directly or indirectly, by electrochemical means. The procedure is rapid and is not capital intensive, in contrast to the prior art procedures discussed above.

EXAMPLES

EXAMPLE 1

Voltammetric studies were effected on an aqueous solution containing about 1.5 g/L of chlorine dioxide and about 1.1 g/L of chlorine and having a pH of 1.1 using a rotating platinum disc electrode having a surface area of 0.196 cm$^2$ for the reaction $Cl_2 \rightarrow Cl^-$. The electrode was rotated at 400 rpm during the electroreduction. The reduction current was plotted against the applied potential and the results are reproduced in FIG. 1.

As may be seen from this data, the potential at which chlorine reduction occurs is quite different from that at which chlorine dioxide occurs with the low overvoltage platinum material.

As may also be seen from that data, selective removal of chlorine occurs at these pH values using a low overpotential cathode in only the narrow range of applied potential of +0.8 to +1.2 volts vs. SCE.

Example 2

The voltammetric studies of Example 1 were repeated for variations in the pH of the solution. The reduction current again was plotted against the applied potential and the results are reproduced in FIG. 2.

As may be seen from this data, a change of pH towards more alkaline values shifts the potential at which electroreduction of chlorine occurs to more negative values (vs. SCE), while the potential for electroreduction of chlorine dioxide remains unaltered. This data also demonstrates the preference for pH values les than 2 for the direct reduction reaction.

Example 3

The voltammetric studies of Example 1 were repeated for variation in concentrations of chlorine dioxide and chlorine at pH 0.6. The reduction current again was plotted against the applied potential and the results are reproduced in FIG. 3. The labelled curves are identified, as follows:

| Curve No. | Concentrations g/L | |
|---|---|---|
| | $ClO_2$ | $Cl_2$ |
| 1 | 0.9 | 0.7 |
| 2 | 1.5 | 1.3 |
| 3 | 2.1 | 1.8 |
| 4 | 2.6 | 2.2 |
| 5 | 2.9 | 2.6 |

As may be seen from the data presented in FIG. 3, the electrode potential required for selective removal of chlorine is independent of chlorine concentration and of chlorine dioxide concentration.

Example 4

The voltammetric studies of Example 1 were repeated using a glassy carbon cathode of overpotential to the reaction $Cl_2$ $Cl^-$ of about 0.5 volts, at varying pH values. The reduction current again was plotted against the applied potential and the results are reproduced in FIG. 4.

As may be seen from the data, using a high overpotential cathode does not permit direct electrochemical reduction of chlorine, although chemical reduction of chlorine by electrolytically-formed chlorite may be effected under quite different electrode potential conditions.

Example 5

This Example illustrates the indirect removal of chlorine from aqueous solutions of chlorine dioxide and chlorine using a high overpotential cathode.

A series of electrolytic experiments were carried out in which an aqueous solution of chlorine dioxide and chloride was treated in the cathode chamber of a cation-exchange membrane-divided electrolytic cell operated in a flow-by mode. The cathode chamber had a three-dimensional reticulated vitreous carbon electrode equipped with a DSA current feeder. The cathode possessed the superficial dimensions of length 17 cm, width 3.3 cm and thickness 0.3 cm. The anode chamber had a glassy carbon anode and the electrolyses were carried out in a potentiostatic mode with cathode potential set in the range of limiting current formation for the $ClO_2$ reduction process. The anolyte was 0.5N sulphuric acid and the anolyte and catholyte flow rates were each 140 ml/min. The membrane was made of "NAFION" (trade mark of Du Pont for a perfluorinated sulfonic acid-type membrane material).

The results obtained are set forth in the following Table I:

TABLE I

| No. of | | ORP (V vs SCE) | Applied potential (V vs SCE) | Current Amps | pH | $Cl_2$ (g/L) | $ClO_2$ (g/L) | NaCl (g/L) | Duration of Run [min] | Total charge passed [C] |
|---|---|---|---|---|---|---|---|---|---|---|
| 1 | Initial | 0.977 | 0.60 | 2.2 | — | 0.66 | 5.65 | 1.79 | 3 | 503 |
| | Final | — | 0.60 | — | 1.6 | 0 | 5.67 | 2.16 | | |
| 2 | Initial | 1.005 | 0.65 | 1.68 | 1.35 | 0.43 | 4.79 | 2.33 | 6 | 522 |
| | Final | 0.900 | 0.65 | 1.20 | 1.28 | 0.16 | 4.76 | 2.87 | | |
| 3 | Initial | 1.027 | 0.60 | 2.31 | — | 0.81 | 5.35 | 2.61 | 6 | 715 |
| | Final | 0.965 | 0.60 | 1.99 | 1.40 | 0.28 | 5.94 | 3.18 | | |
| 4 | Initial | 1.015 | 0.56 | 2.60 | — | 0.87 | 6.23 | 2.27 | 6 | 851 |
| | Final | 0.910 | 0.56 | 2.20 | 1.36 | 0.18 | 5.99 | 3.06 | | |
| 5 | Initial | 1.046 | 0.57 | 2.10 | — | 0.75 | 3.49 | 2.04 | 12 | 1157 |
| | Final | 0.844 | 0.57 | 1.20 | 1.31 | 0.11 | 3.03 | 3.40 | | |
| 6 | Initial | 1.043 | 0.60 | 2.07 | — | 0.91 | 4.27 | 2.61 | 4 | 450 |
| | Final | 0.886 | 0.60 | 1.90 | 1.44 | 0.46 | 4.11 | 2.95 | | |
| 7 | Initial | 1.008 | 0.60 | 1.80 | — | 0.55 | 4.42 | 1.30 | 5 | 552 |
| | Final | — | 0.60 | 1.40 | 1.44 | 0.12 | 4.08 | 2.38 | | |
| 8 | Initial | 1.107 | 0.54 | 2.10 | 0.7 | 0.95 | 4.93 | 2.61 | 6 | 750 |
| | Final | 0.825 | 0.54 | 1.50 | 0.8 | 0.21 | 4.45 | 3.29 | | |
| 9 | Initial | 0.951 | 0.50 | 1.58 | 2.6 | 0.43 | 4.99 | 2.61 | 7 | 623 |
| | Final | 0.830 | 0.50 | 1.20 | 2.0 | 0.10 | 4.16 | 3.18 | | |
| 10 | Initial | 0.899 | 0.54 | 1.11 | 4.0 | 0.17 g/L $Cl_2$ 0.77 g/L NaOCl | 3.46 | 3.40 | 7 | 416 |
| | Final | 0.703 | 0.54 | 0.90 | 2.6 | 0.22 g/L $Cl_2$ 0.51 g/L NaOCl | 2.82 | 4.09 | | |

As may be seen from the data presented in Table 1, removal of chlorine was rapid and effective, particularly at higher chlorine dioxide contents and low pH. Losses of chlorine dioxide varied between zero and about 10%, demonstrating the selectivity of the electrolysis process.

SUMMARY OF DISCLOSURE

In summary of this disclosure, the present invention provides a novel electrochemical process for the selective removal of chlorine from aqueous solutions of chlorine dioxide and chlorine by using a critical set of parameters for the electrolysis. Modifications are possible within the scope of this invention.

What I claim is:

1. A method of treatment of an aqueous solution of chlorine dioxide and chlorine, which comprises selectively cathodically reducing at least a portion of said chlorine at a pH of said aqueous solution of up to about 4, without substantially decreasing the concentration of said chlorine dioxide in the resulting treated solution.

2. The method of claim 1 wherein said selective cathodic reduction of chlorine is effected directly at a pH of no greater than about 2 using an electrode having a low overpotential for the electrolytic reaction $Cl_2 \rightarrow Cl^-$ at an applied potential of about $+0.8$ to about $+1.2$ volts as compared with a saturated calomel electrode (SCE).

3. The method of claim 2 wherein said applied electrode potential is about 1 volt.

4. The method of claim 1 wherein said selective cathodic reduction is effected using an electrode which has an electroconductive surface constructed of an electroconductive metal, metal alloy, metal oxide or metal compound.

5. The method of claim 1 wherein said selective cathodic reduction of chlorine is effected indirectly using a high overpotential cathode at a pH of up to about 4 at an applied potential of about $+0.8$ to about $-0.6$ volts as compared with SCE, in accordance with the equations:

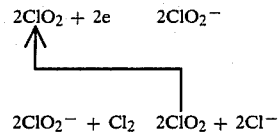

6. The method of claim 1 wherein said selective cathodic reduction is effected using a high surface area cathode having a three-dimensional, electrolyte-contacting surface.

7. The method of claim 6 wherein said cathode comprises stacked layers of electroconductive mesh material through the interstices of which percolates the aqueous solution of chlorine dioxide and chlorine generally parallel to the current flow.

8. The method of claim 6 wherein said cathode comprises a packed bed of individual electroconductive particles through which percolates the aqueous solution of chlorine dioxide and chlorine generally perpendicular to the current flow.

9. The method of claim 6 wherein said cathode is located in a cathode chamber of a cell, an anode is located in an anode chamber of the cell and the anode chamber and cathode chamber are separated by an ion-exchange membrane.

10. The method of claim 1 wherein said selective cathodic reduction is effected by applying a constant voltage to a cathode and an anode during the electrolytic reduction of the chlorine.

11. The method of claim 10 wherein the applied voltage between the anode and the cathode is less than about 2 volts.

12. The method of claim 1 wherein said aqueous solution of chlorine dioxide and chlorine contains about 0.1 to about 20 g/L of chlorine dioxide and about 0.01 to about 10 g/L of chlorine.

* * * * *